(12) United States Patent
Krenzer et al.

(10) Patent No.: US 8,801,344 B2
(45) Date of Patent: Aug. 12, 2014

(54) DRILL BIT

(75) Inventors: Ulrich Krenzer, Zirndorf (DE); Peter Marz, Dietenheim (DE)

(73) Assignee: MAPAL Fabrik für Präzisionswerkzeuge Dr. Kress KG, Aalen (DE)

( * ) Notice: Subject to any disclaimer, the term of this patent is extended or adjusted under 35 U.S.C. 154(b) by 240 days.

(21) Appl. No.: 13/376,376

(22) PCT Filed: Jun. 8, 2010

(86) PCT No.: PCT/EP2010/003417
§ 371 (c)(1),
(2), (4) Date: Dec. 5, 2011

(87) PCT Pub. No.: WO2010/142411
PCT Pub. Date: Dec. 16, 2010

(65) Prior Publication Data
US 2012/0076597 A1 Mar. 29, 2012

(30) Foreign Application Priority Data
Jun. 8, 2009 (DE) .......................... 10 2009 025 223

(51) Int. Cl.
*B23B 51/02* (2006.01)
(52) U.S. Cl.
CPC ............. *B23B 51/02* (2013.01); *B23B 2251/70* (2013.01); *B23B 2251/18* (2013.01); *B23B 2251/04* (2013.01)
USPC ....................................................... 408/230
(58) Field of Classification Search
CPC B23B 51/02; B23B 2251/14; B23B 2251/18; B23B 2251/28
USPC .......................................... 408/230, 227, 229
See application file for complete search history.

(56) References Cited

U.S. PATENT DOCUMENTS 3,387,511 A * 6/1968 Ackart, Sr. et al. ........... 408/230
3,564,947 A * 2/1971 Maier ........................... 408/211
(Continued)

FOREIGN PATENT DOCUMENTS

DE 103 37 985 A1 3/2005
DE 10 2007 037 911 A1 4/2008
(Continued)

OTHER PUBLICATIONS

"Perçage, forage, alèsage: 2-Les arêtes de coupe des forets hélicoïdaux," *Machines Production*, No. 562, pp. 37-39 (Sep. 3, 1991).

(Continued)

*Primary Examiner* — Daniel Howell
*Assistant Examiner* — Nicole N Ramos
(74) *Attorney, Agent, or Firm* — Kilpatrick Townsend & Stockton LLP

(57) ABSTRACT

The invention proposes a drill bit (1) leaving at least one main cutting edge (3, 3') and at least one center cutting edge (15, 15'), wherein the drill bit (1) comprises a longitudinal axis (13), and wherein the at least one main cutting edge (3, 3') and the at least one center cutting edge (15, 15') are each assigned a rake face (7, 7', 11, 11'). The drill bit (1) is characterized in that the rake face (11, 11') assigned to the at least one center cutting edge (15, 15') has at least two part faces (19, 19'; 21, 21') which—as seen as perpendicular to the longitudinal axis (13) of the drill bit (1)—form an obtuse angle with one another, so that the at least one center cutting edge (15, 15') comprises at least two part cutting edges (23, 23'; 25, 25').

13 Claims, 13 Drawing Sheets

(56) References Cited

U.S. PATENT DOCUMENTS

| | | | |
|---|---|---|---|
| 4,583,888 A * | 4/1986 | Mori et al. | 408/59 |
| 7,789,599 B2 * | 9/2010 | Takikawa | 408/230 |
| 2011/0103909 A1 | 5/2011 | Krenzer | |

FOREIGN PATENT DOCUMENTS

| | | |
|---|---|---|
| DE | 10 2007 040 178 A1 | 2/2009 |
| EP | 0 681 882 A2 | 5/1995 |
| JP | 59-161208 | 9/1984 |
| JP | 63-288615 A | 11/1988 |
| JP | 02-298407 A | 12/1990 |
| JP | 06285709 A * | 10/1994 |
| JP | 06-320316 A | 11/1994 |
| JP | 10058291 A * | 3/1998 |
| JP | 2003340622 A * | 12/2003 |
| WO | WO 2009/090042 A2 | 7/2009 |

OTHER PUBLICATIONS

Office Action from JP Appl. No. 2012-513514, dated Jan. 7, 2014 (English version only).

* cited by examiner

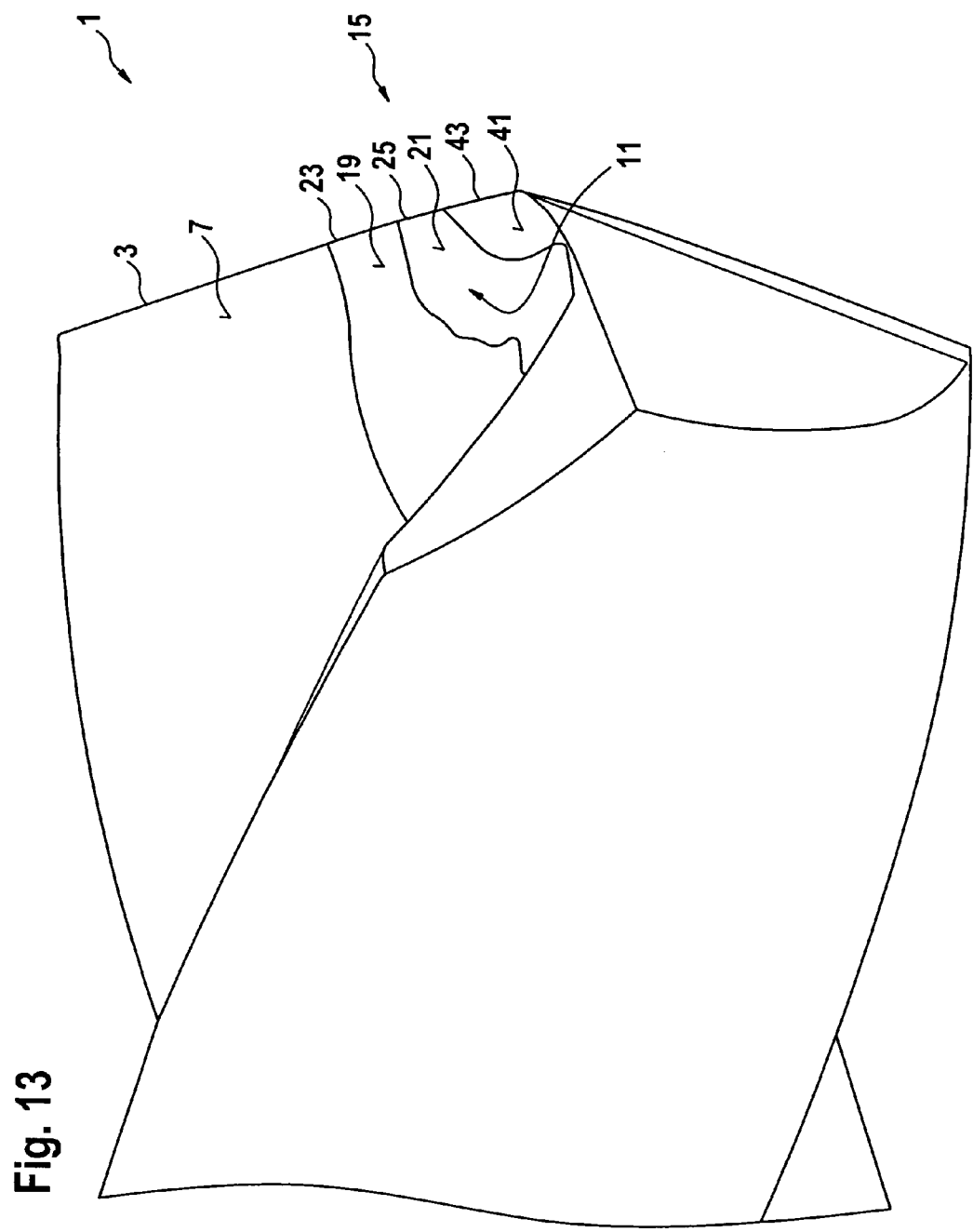

DRILL BIT

PRIORITY

The present application is a U.S. National Phase of PCT/EP2010/003417, filed Jun. 8, 2010, which claims the benefit of German Application No. 10 2009 025 223.1, filed on Jun. 8, 2009, the entire contents of which are incorporated by reference herein in their entirety.

DESCRIPTION

The invention relates to a drill bit according to the preamble of Claim 1.

Drill bits of the type named are known. They have at least one cutting edge, which extends from a circumference surface of the drill bit essentially in the direction of its center. In the area of the center of the drill bit, a cutting edge area is formed, which because of a definitely larger wedge angle than the one in the radially outer cutting edge areas, it scrapes and presses rather than cuts. If the drill bit preferably comprises two main cutting edges mounted centrally symmetrically with respect to each other—seen in top view to the face side of the drill bit—in the center area of the drill bit, a cross cutting edge is formed that connects the two main cutting edges. This has a clearly larger wedge angle than the main cutting edges. In addition, the cutting speed, i.e. the travel speed of the cutting edges, increases from the circumference surface to the center. Because of this, in the area of the cross cutting edge, high pressure loads occur that lead to increased friction. The scraping, pressing operating method of the cross cutting edge and the high pressure loads because of the low cutting speed lead to the fact that in the area of the drill bit center a clearly higher force must be used to rotate it, which makes drilling more difficult.

For this reason, with known drill bits, a so-called point thinning is provided. In particular, with solid hard metal drill bits and high-performance high speed steel drill bits, which usually have a relatively large core diameter from 25 to 35% of the drill bit diameter, such a point thinning is advantageous since the cross cutting edge and/or the center area must be designed especially large here. Each main cutting edge of the drill bit has a rake face assigned, the intersection line of which defines the main cutting edge with an open face. During point thinning, the cutting surface is ground so that another rake face develops that—seen in radial direction—is mounted further toward the center of the drill bit than the remaining part of the original rake face, whereby the two rake faces—seen perpendicular to the longitudinal axis of the drill bit—form an obtuse angle with each other. Because of this grinding of the rake face, a center cutting edge is formed that connects the main cutting edge with the now clearly reduced center area and/or the cross cutting edge of the drill bit. Because of the reduced center area and/or the shortened cross cutting edge, this type of point-thinned drill bit has a definitely lower rotation resistance, which makes the drill bit lighter.

However, it has been found that during machining of very tough materials, e.g. stainless steel, simultaneously an adequate stability of the center cutting edge and on the other, an adequately large chip space in the area of it can be provided. In comparison to the main cutting edge, the center cutting edge must have increased stability, since in this case higher forces are acting because of the lower cutting speed. The stability of the center cutting edge results from its wedge angle. This is the angle that the open face and the rake face of one cutting edge form with each other. With large wedge angle, more material is available to the center cutting edge, in which forces can be introduced; it is thus more stable. At the same time, possible vibrations can be better absorbed and/or damped. However, a large wedge angle reduces the chip space so the chips that develop in the area of the point thinning can be jammed in the direction of the cutting edge so the cutting forces that is high anyway can be further increased. In order to increase the chip space and thus improve the chip flow, the wedge angle must be reduced so the center cutting edge has a lower stability and can no longer absorb vibrations and/or can no longer damp them as this is the case with larger wedge angles. It can thus be seen that with known drill bits an optimal stability of the center cutting edge and an optimal chip discharge are mutually exclusive. The consequence of cutting edge stability on one hand and size of the chip space on the other that are not adequately tuned to each other is that a breakout of the drill bit in the area of the center cutting edge can be expected.

Thus the object of the invention is to produce a drill bit in which the disadvantages named do not occur, which thus has both an adequately stable center cutting edge and an adequately large chip space in this area.

The object is achieved by a drill bit with the characteristics of Claim 1. The drill bit has at least one main cutting edge and at least one center cutting edge. In addition it has one longitudinal axis and one rake face that is assigned to at least one main cutting edge and the at least one center cutting edge. The drill bit is distinguished in that the rake face assigned to the at least one center cutting edge has at least two partial faces that—seen perpendicular to the longitudinal axis of the drill bit—form an obtuse angle with each other so the at least one center cutting edge comprises at least two partial cutting edges. Ultimately this means that the drill bit, in addition to a first point thinning, is point thinned at least a second time. The center cutting edge is thus divided into at least two partial cutting edges, whereby the partial cutting edge that lies further inward radially has greater stability with a smaller chip space, while the partial cutting edge that lies further outward radially has low stability, i.e. a lower wedge angle with greater chip space. Thus the center cutting edge can be tuned locally, according its radial distance from the center, to the requirements defined by cutting speed and amount of chips, so that in particular in an area of high load, a high stability of the center cutting edge is ensured, while in an area of lower load, but higher chip quantity adequate chip space is available to ensure friction-free removal of chips.

A preferred exemplary embodiment of the drill bit is distinguished in that the main cutting edge and the at least two partial cutting edges of the center cutting edges are each assigned a front rake angle, the value of which increases with increasing radial distance of the assigned main and/or partial cutting edge with respect to the longitudinal axis of the drill bit. The cutting edges of the drill lying further outside radially thus have a greater front rake angle than those that are arranged further radially inside.

Also preferable is a drill bit, in which at least the front rake angle assigned to the partial cutting edge that is arranged closest to the longitudinal axis of the drill bit has a negative value. The front rake angle thus preferably becomes greater from the center in the direction of the drill bit circumference surface until it assumes a positive value at the latest in the area of the main cutting edge. A negative front rake angle causes a large wedge angle so in this area, there is high stability of the cutting edge. The front rake angle that increases radially outward also results in it being easier for the cutting edge to cut in the area of higher cutting speeds, i.e. toward the circumference surface.

Other advantageous designs result from the subclaims.

The invention will be explained in more detail in the following with the use of the drawings.

Figure 3:
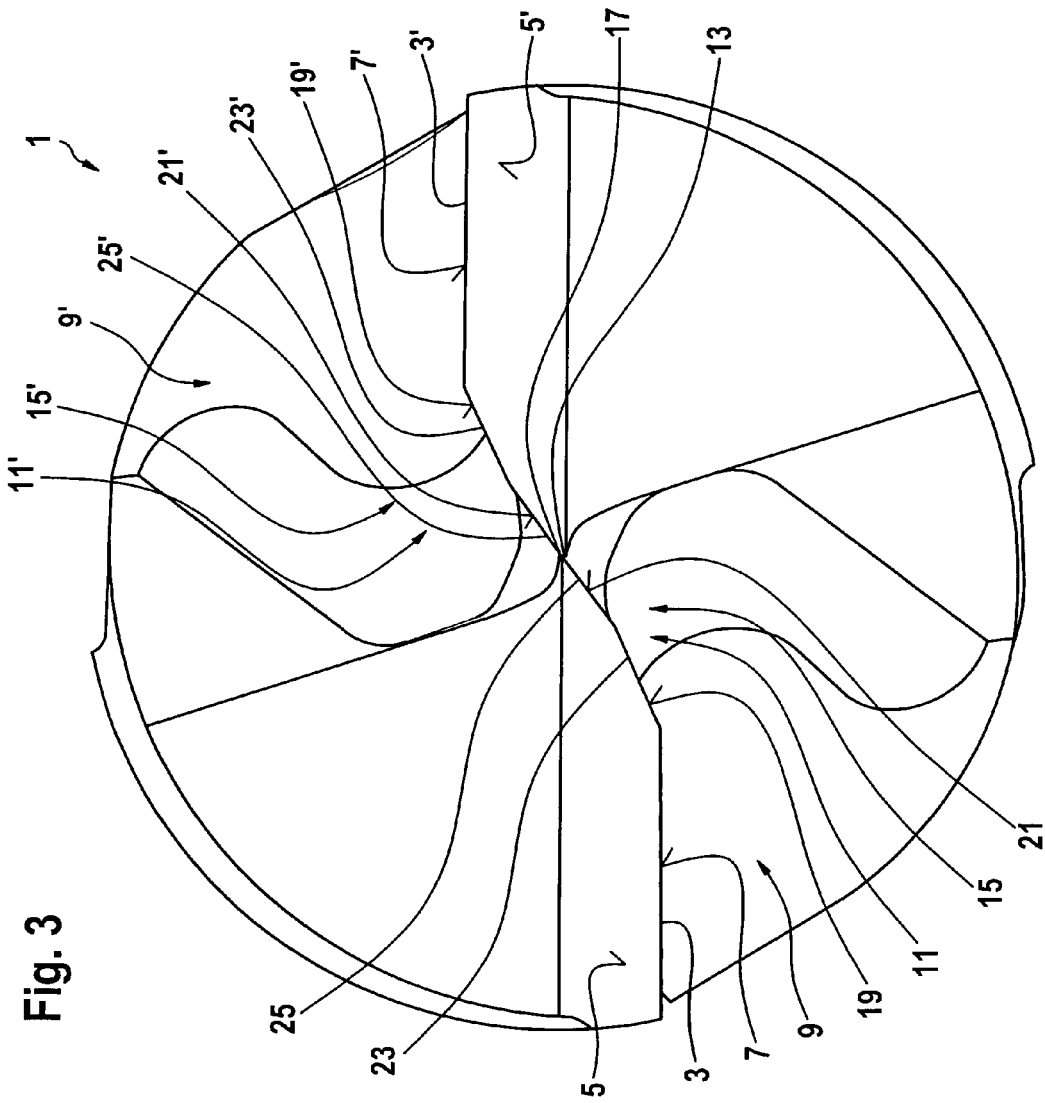
FIG. 3 shows a face view of a first exemplary embodiment of a drill bit according to the invention.
Figure 10:
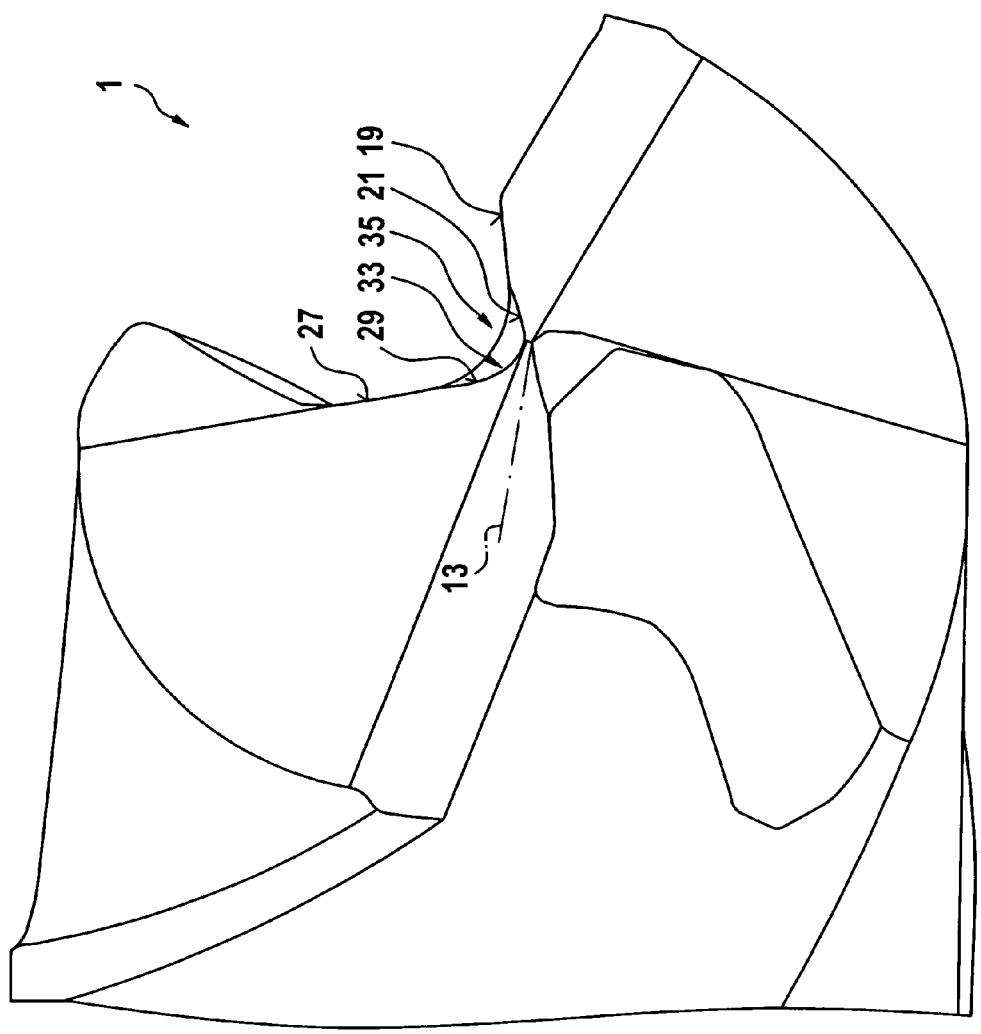
Figure 11:
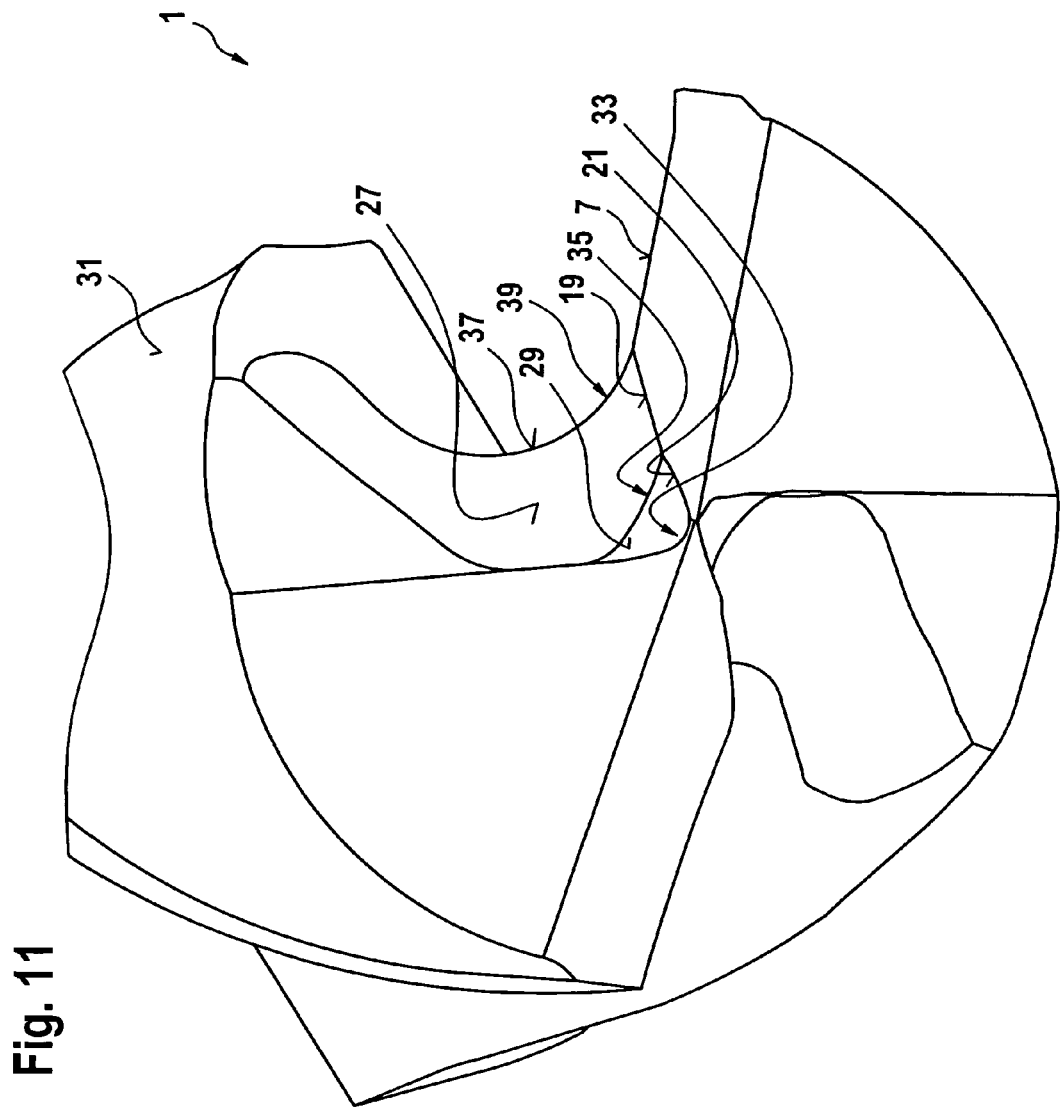
Figure 12:
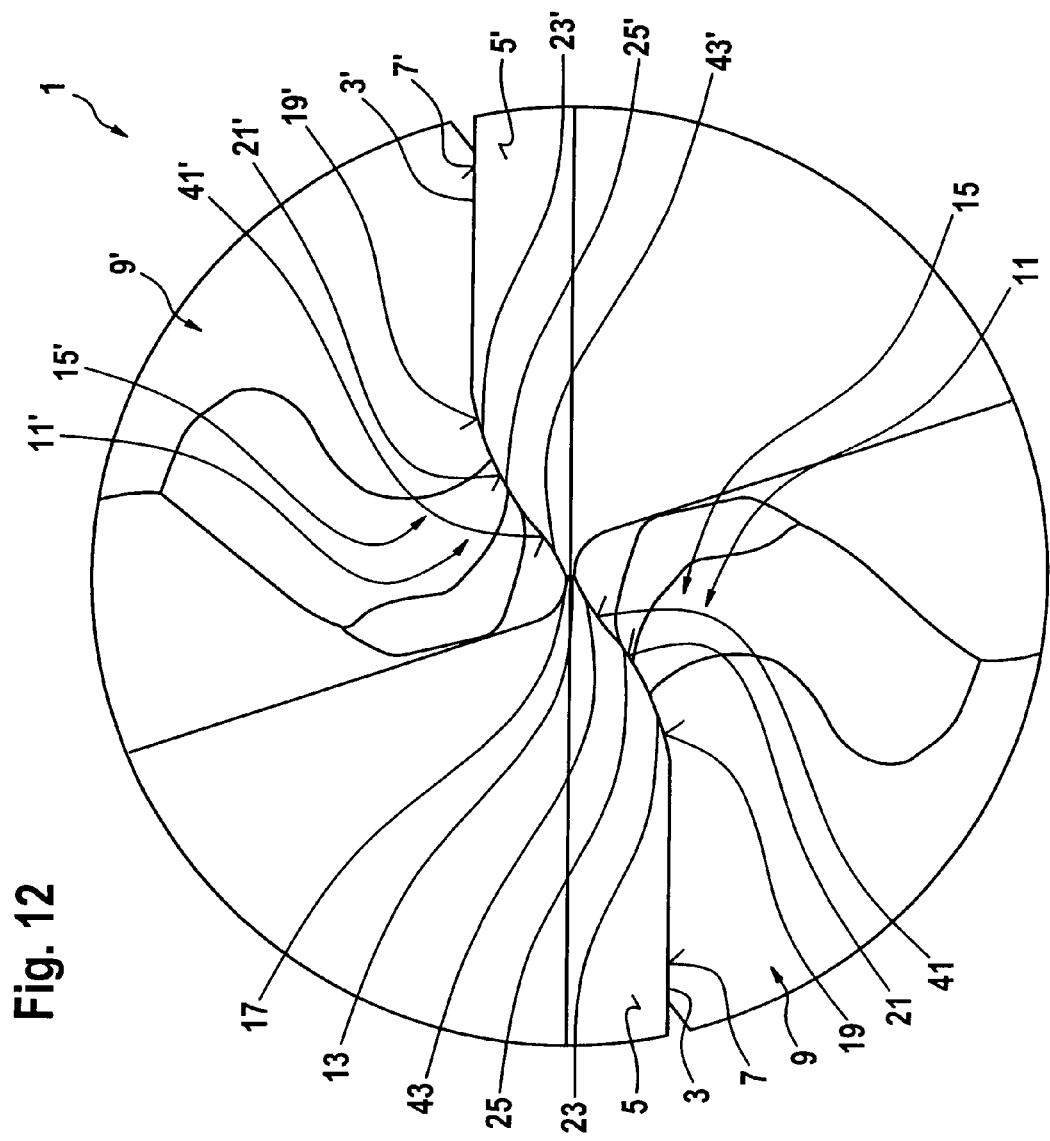

FIG. 10 shows a view of the drill bit according to FIG. 3, wherein the direction of view is chosen to be in the direction of a lateral boundary surface of a partial face that is assigned to the partial cutting edge of the center cutting edge that is placed further outward radially, FIG. 11 shows a view of the drill bit according to FIG. 3, wherein the direction of view is chosen to be in the direction of a lateral boundary surface that is assigned to the rake face of the main cutting edge;

FIG. 12 shows a face view of a second exemplary embodiment of a drill bit according to the invention, and FIG. 13 shows a side view of the drill bit according to FIG. 12.

Figure 1:
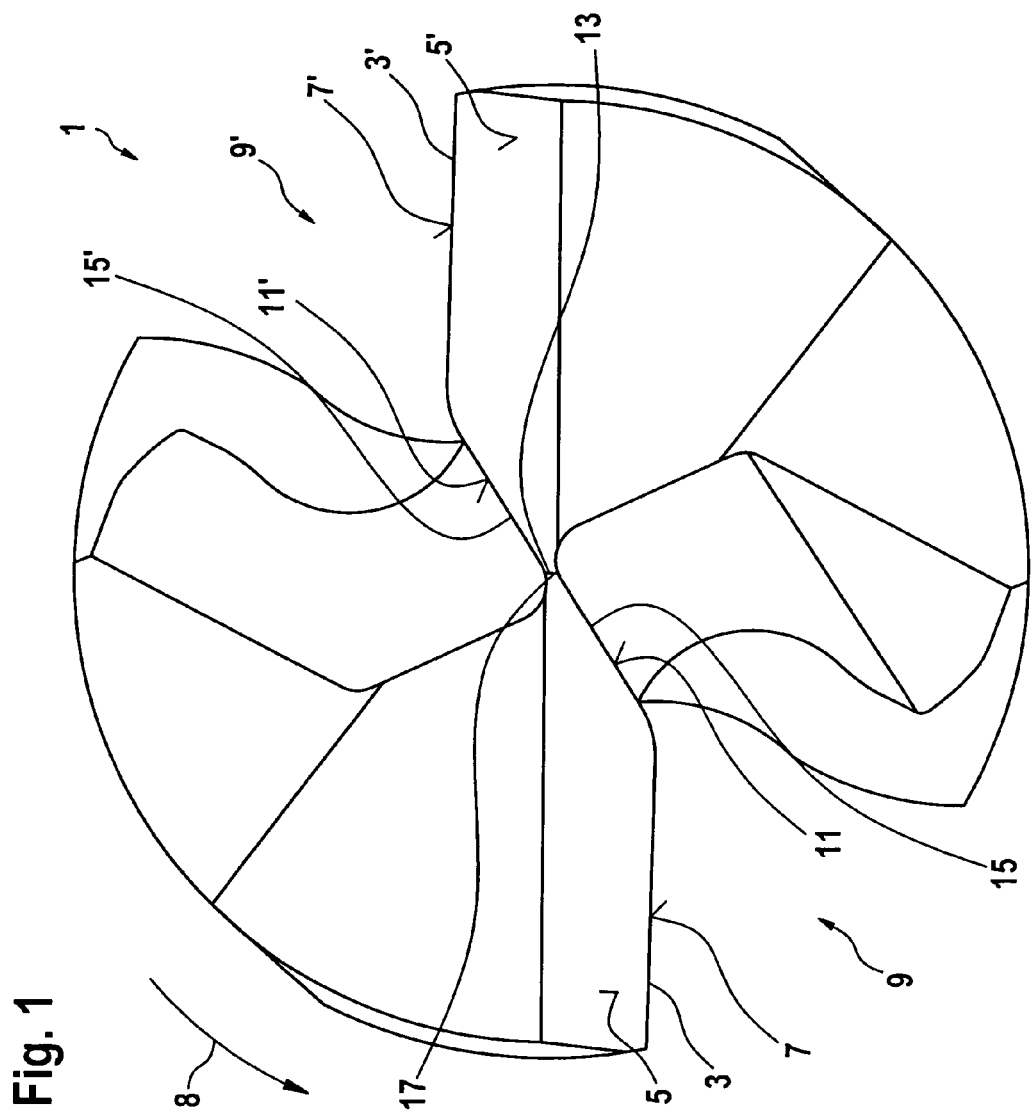
FIG. 1 shows a face view of a known drill bit with conventional geometry.

FIG. 1 shows a face view of a known drill bit 1 that has a conventional geometry with a point thinning. It comprises at least one main cutting edge, in this case exactly two main cutting edges 3, 3'. The main cutting edges 3, 3' are each formed by the intersection line of an open face 5, 5' with a rake face 7, 7'. The open faces 5, 5'; trail the main cutting edges 3, 3' in cutting direction, whereby the cutting direction in this case is the direction of rotation of the drill bit during processing of a workpiece. In the exemplary embodiment shown, this direction is counterclockwise, which is indicated by arrow 8. The open faces 5, 5' drop opposite the cutting direction so they form an angle with a plane oriented parallel to a surface of the workpiece to be machined, which is called clearance angle. On the rake faces 7, 7', chips proceed that are removed from the workpiece by the main cutting edges 3, 3'. The rake faces 7, 7' form an angle with a plane that is aligned perpendicular to the machined surface of the workpiece and parallel to the respective main cutting edge 3, 3', which is called the front rake angle. The front rake angle is 0° if the rake face is oriented parallel to the plane. It is indicated as a positive angle when the rake face drops opposite the cutting direction and is indicated as a negative angle when the rake face 7, 7' rises opposite the cutting direction.

The rake faces 7, 7' and the open faces 5, 5' together form an angle that is called the wedge angle. It is found that the total of front rake angle, wedge angle and clearance angle always total 90°. The wedge angle determines the stability of the cutting edge since with large wedge angle, more material is available accordingly for absorbing the cutting forces and/or damping vibrations than with smaller wedge angle. With fixed clearance angle, the wedge angle determines the front rake angle so it especially specifies what volume is available to the discharged chips in the chip spaces 9, 9' defined by the rake faces 7, 7'.

Due to the point thinning, the rake faces 7, 7' are divided into two partial faces and/or new rake faces 11, 11' are formed that—seen perpendicular to a longitudinal axis 13 of the drill bit 1—form an obtuse angle with each other. The rake faces 11, 11' in turn have intersection lines with the open faces 5, 5' so center cutting edges 15, 15' are formed here. These are connected to each other by a cross cutting edge 17 that runs through the center of the drill bit, preferably intersecting the longitudinal axis 13.

With increasing radial distance from the longitudinal axis 13, the cutting speed increases due to the higher feed rate of the drill bit 1. This especially means that in the area of the center cutting edges 15, 15' there is a relatively low cutting speed that decreases even more in the direction of the longitudinal axis 13. Because of this, there are especially high cutting forces in this area. At the same time, chips must be removed as efficiently as possible and transferred to the center cutting edges 15, 15' without jamming, because otherwise additional forces act on them and there can be an overload. Adequate stability of the center cutting edges 15, 15' for absorbing the cutting forces and damping possible vibrations can be achieved with an adequately large wedge angle. On the other hand, a large wedge angle leads to a case in which the rake faces 11, 11' extend further into the chip spaces 9, 9' because at the given clearance angle the front rake angle becomes smaller. In particular, when a negative front rake angle will be implemented, the center cutting edge 15, 15' is especially stable but the chip space is relatively small so jamming of the chips on the center cutting edges 15, 15' can occur easily. In contrast, if the chip space volume is increased due to an adequately large front rake angle and thus a correspondingly smaller wedge angle at the given clearance angle so the chips can flow out freely, this in turn leads to lower stability of the center cutting edges 15, 15'. Thus it can be seen that with a conventional point thinning geometry it is not possible to optimize both the stability of the center cutting edges 15, 15' and the chip space volume necessary for problem-free discharge of the chips.

Figure 2:
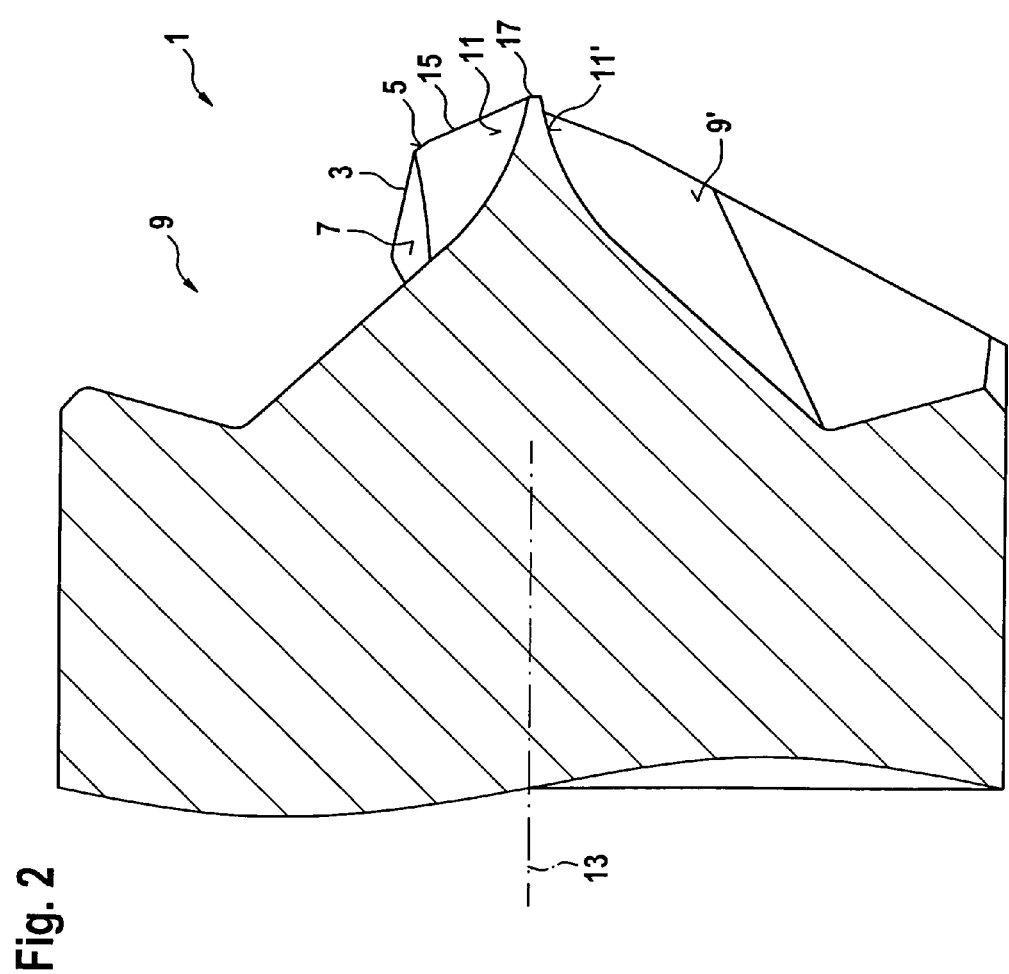
FIG. 2 shows a longitudinal cross section through the drill bit according to FIG. 1.

FIG. 2 shows a longitudinal cross section through the drill bit according to FIG. 1. Elements that are the same or have the same function are provided with the same reference numbers so reference is made to the previous description regarding them. As already stated, the wedge angle is determined as an angle formed by a rake face with an assigned open face. In this case, the wedge angle is especially of interested that is formed by the rake faces 11, 11' of the center cutting edges 15, 15' with the open faces 5, 5'. It can be seen that in the area of the center cutting edge 17, the open faces 5, 5' disappear. In this area, the clearance angle is then given as the angle between the rake face 11 of the center cutting edge 15 and the rake face 11' of the center cutting edge 15', whereby each of these rake faces mutually forms the open face for the rake face assigned to the other center cutting edge. In FIG. 2, a spur of the rake face 11' of the center cutting edge 15' can also be seen. Thus the wedge angle in the area of the center cutting edge 17 can be indicated as the angle that the rake faces 11, 11' form with each other in this area. From FIG. 2, it is clear that with a conventional point thinning geometry this wedge angle is very small, so adequate stability of the center cutting edges 15, 15' cannot be ensured here. However, at the same time it can also be seen that the chip spaces 9, 9' are relatively small in the area of the rake faces 11, 11', especially in the direction toward the longitudinal axis 13. Thus the conventional point thinning geometry does not ensure either adequate stability of the center cutting edges 15, 15' or an adequately large chip space volume for the chip spaces 9, 9' in the area of the center cutting edges 15, 15' and especially in an area arranged radially close to the longitudinal axis 13.

FIG. 3 shows a face view of a first exemplary embodiment of a drill bit 1 according to the present invention. Elements that are the same or have the same function are provided with the same reference numbers so reference is made to the previous description regarding them. Here as well, one rake face 7, 7' is assigned to each of the main cutting edges 3, 3'. In each case, a rake face 11, 11' is assigned to the center cutting edges 15, 15'. It can now be seen that the drill bit 1 according to the invention has another point thinning, whereby the rake faces 11, 11' assigned to the center cutting edges 15, 15' are ground or otherwise machined such that they each have partial faces, namely a partial faces 19, 19' arranged further outside radially—seen in the direction to the longitudinal axis 13—and a partial face 21, 21' arranged further inward radially. These partial faces 19, 19' and 21, 21' each have a intersection line with the open faces 5, 5' so the center cutting edges 15, 15' each comprise a partial cutting edge 23, 23' that is assigned to the partial face 19, 19' and a partial cutting edge 25, 25' that is assigned to the partial face 21, 21'. With the partial face 21, the partial face 19—seen perpendicular to the longitudinal axis 13 of the drill bit 1—forms an obtuse angle such that the partial cutting edges 23, 25 also form an obtuse angle with each other. In the same way, the partial faces 19' and 21' form an obtuse angle with each other such that the partial cutting edges 23' and 25' form an obtuse angle with each other.

The exemplary embodiment shown of a drill bit 1 is generally produced from a conventional drill bit without any point thinning in such a way that first a first point thinning that is arranged further inward radially is produced, whereby the partial faces 21, 21' are formed. After that, a second point thinning that is arranged further outward radially is produced so the partial faces 19, 19' develop. Naturally it is also possible to select the sequence of the point thinnings in reverse, i.e. so that first the partial faces 19, 19' and then the partial faces 21, 21' are formed.

It can be seen that in the exemplary embodiment shown in FIG. 3, each main cutting edge 3, 3' has two point thinnings, so the center cutting edges 15, 15' are divided into two partial cutting edges 23, 23' and 25, 25'. In another exemplary embodiment, it is also possible that more than two point thinning are provided for, such that center cutting edges 15, 15' are divided into more than two partial cutting edges 23, 23' and 25, 25'. In yet another exemplary embodiment, the drill bit 1 may also have only one main cutting edge 3. In this case, it is also possible to design the geometry of the drill bit using point thinning two times or multiple times so that a center cutting edge 15 comprises two or more partial cutting edges 23, 25. Another exemplary embodiment of a drill bit 1 can preferably comprise more than two main cutting edges 3, 3', whereby here as well two or more point thinnings can be provided for on one main cutting edge, on several main cutting edges or on all main cutting edges. Naturally it is also possible in an exemplary embodiment with two main cutting edges 3, 3' to provide point thinning twice or multiple times only on one main cutting edge 3.

Figure 4:
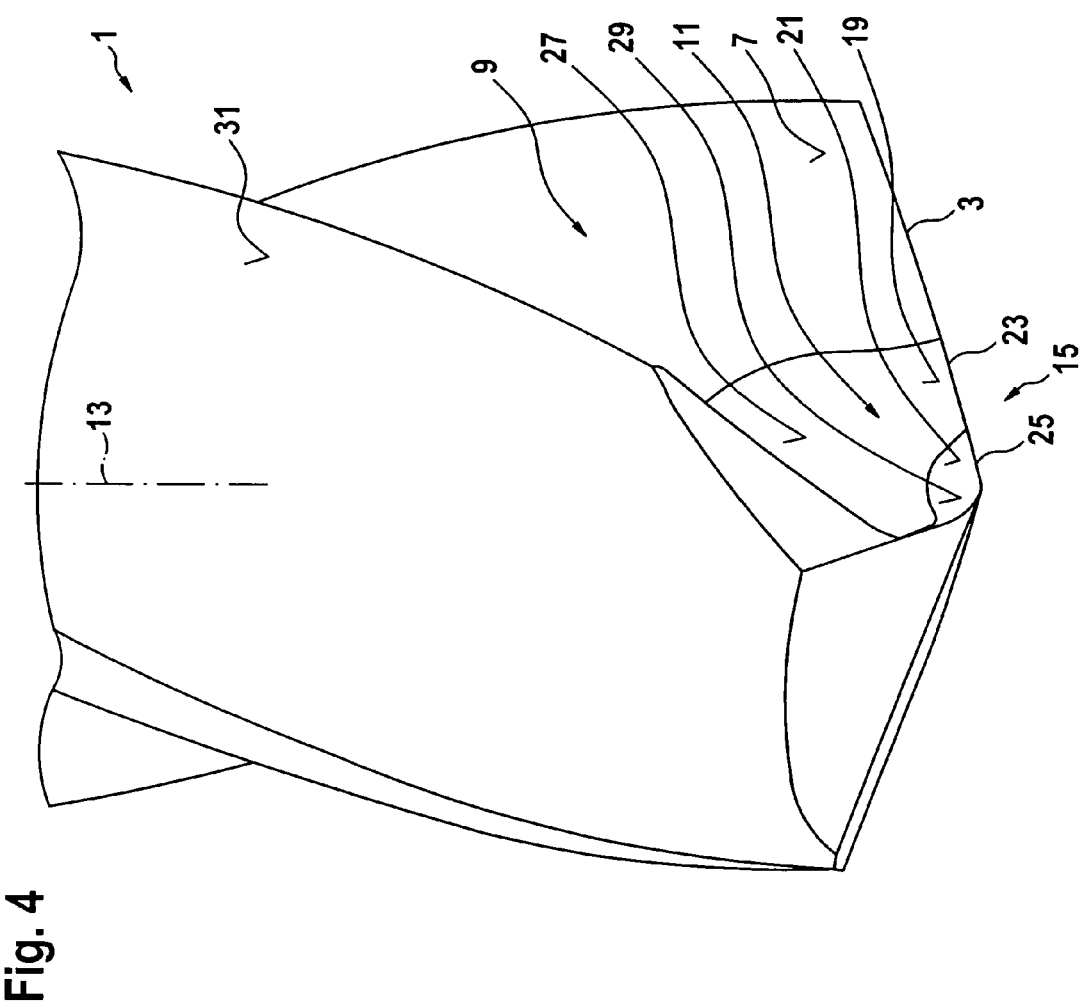
FIG. 4 shows a side view of the drill bit according to FIG. 3.

FIG. 4 shows a side view of the drill bit 1 according to FIG. 3. Elements that are the same or have the same function are provided with the same reference numbers so reference is made to the previous description regarding them. Lateral boundary surfaces are assigned to the rake face 7 and to each of the partial faces 19 and 21 of the rake face 11, of which in this case a lateral boundary surface 27 that is assigned to the partial face 19 and a lateral boundary surface 29 that is assigned to the partial face 21 can be seen. A lateral boundary surface that is assigned to the rake face 7 is not shown since it is covered by the circumference surface 31 of the drill bit 1. Because of the cutting speed that decreases radially in the direction toward the longitudinal axis 13, the chips removed by the main cutting edge 3 and the partial cutting edges 23, 25, flow on the rake face 7 and/or partial faces 19, 21 in the direction of the lateral boundary surfaces 27, 29 and to the lateral boundary surface that is assigned to the rake face 7 and are deflected and formed by it. In particular, the chips can also curl, which is optimal for a removal of the chips in the chip space 9.

The rake face 7 and/or partial faces 19, 21, preferably each form different angles with the respectively assigned lateral boundary surfaces 27, 29 and/or the lateral boundary surface of the rake face 7 that is not shown. Thus the rake surface 7 preferably forms a different angle with the lateral boundary surface assigned to it, than the partial face 19 forms with the boundary surface 29 assigned to it. In turn, the partial face 21 forms yet another angle with the lateral boundary surface 29 assigned to it.

In another exemplary embodiment, it is also possible that the angles that are formed by the rake face 7 and/or the partial faces 19, 21 are the same as those formed with the lateral boundary surfaces 27, 29.

The angles that the rake face 7 and/or the partial faces 19, 21 forms with the lateral boundary surfaces 27, 29 respectively assigned to them preferably lie between 60° and 140°, preferably between 70° and 130°, and especially preferably 80° and 120°. In another exemplary embodiment, the angles can be divided around 100°, i.e. especially be approximately 100°. In yet another exemplary embodiment, however, especially large angles are implemented, preferably up to 160°, especially preferably up to 170°.

It is naturally understood that everything that was stated in connection with FIG. 4 applies in exactly the same way for each other main cutting edge 3, 3' of drill bit 1, which has at least two point thinnings. Only for the sake of simplicity, in the description of FIG. 4 the dotted reference numbers are not mentioned. It can also be seen that if more than two point thinnings are provided, more than three lateral boundary surfaces 27, 29 are provided—under consideration of the lateral boundary surface not shown in FIG. 4—whereby each of these lateral boundary surfaces 27, 29 is assigned to a rake face 19, 21.

Figure 5:
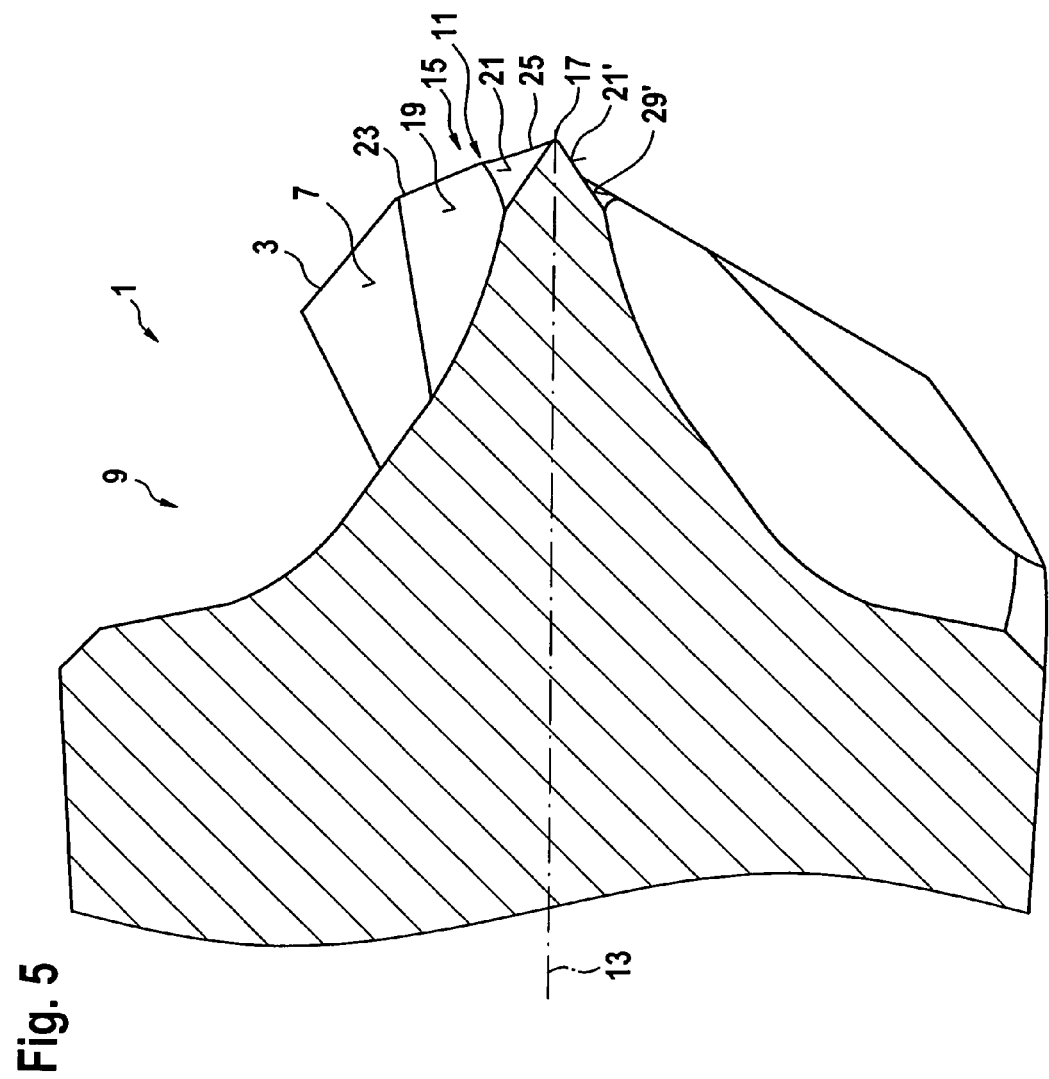
FIG. 5 shows a longitudinal cross section through the drill bit according to FIG. 3.

FIG. 5 shows a longitudinal cross section through the drill bit 1 according to FIG. 3. Elements that are the same or have the same function are provided with the same reference numbers so reference is made to the previous description regarding them.

In FIG. 5 it is clear that the point thinning arranged closer to the longitudinal axis 13—seen in radial direction—is applied to the drill bit 1 at a greater angle with respect to the longitudinal axis 13. This can especially be seen from the angles that the partial faces 19, 21 form with the longitudinal axis 13. The wedge angle in the area of the cross cutting edge 17 is defined here by the angle that the spurs arranged in the area of the cross cutting edge 17 of the partial faces 21, 21' form with each other. This correlates completely to the type in which the wedge angle was determined in the area of the cross cutting edge 17 in connection with the exemplary embodiment shown in FIG. 2. It can now be seen that in the exemplary embodiment shown in FIG. 5, in this area a clearly larger wedge angle is present than is the case with the conventional drill bit 1 shown in FIG. 2. In particular, the partial cutting edges 25, 25' thus have increased stability and can thus better absorb cutting forces and damp vibrations or preferably not even let them develop. At the same time, it can be seen that the front rake angle assigned to the partial cutting edge 23 in the exemplary embodiment according to FIG. 5 is greater than the front rake angle that was assigned to the center cutting edge 15 in the conventional drill bit 1 from FIG. 2. Because of the larger front rake angle, the partial face 19 extends less into the chip space 9 so more space remains here in which the chips can travel without friction. In this way jamming on the partial cutting edge 23 is securely prevented so there will also be no overload of the center cutting edge 15.

The exemplary embodiment of a drill bit 1 shown in FIG. 5 thus combines definitely increased stability in the area of the lowest cutting speed with an advantageously enlarged chip space in an area of higher cutting speed arranged further outward radially so at the same time a high stability of the center cutting edge in the area of the center and an efficient chip removal in an area arranged further outward radially are ensured.

Figure 6:
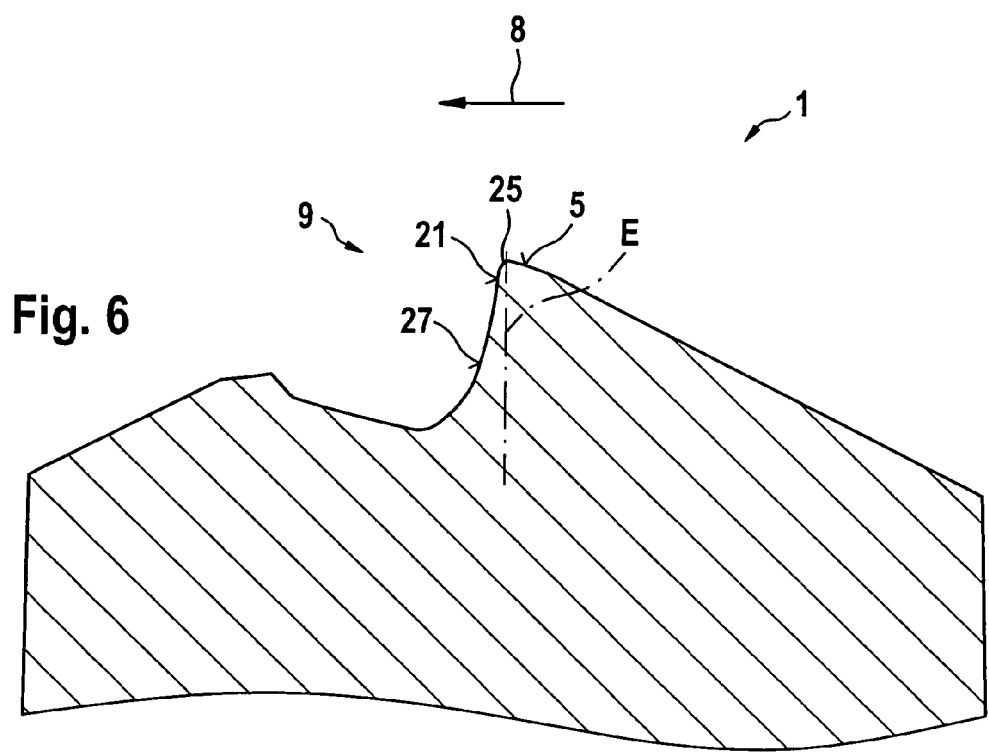
FIG. 6 shows a longitudinal cross section through the drill bit according to FIG. 3 in a plane at which the partial cutting edge of the center cutting edge that lies the furthest radially inward is perpendicular.

FIG. 6 shows a longitudinal cross section through the drill bit 1 according to FIG. 3 in a plane that is perpendicular to the partial cutting edge 25. Elements that are the same or have the same function are provided with the same reference numbers so reference is made to the previous description regarding them. In FIG. 6, the open face 5 and the partial face 21 of the rake face 11 are shown, their intersection line forming the partial cutting edge 25. In this view, the partial face 21 turns into a spur of the lateral boundary surface 27 that is assigned to the partial face 19 of the rake face 11. It can be seen that in the area of the partial cutting edge 25 there is a relatively large wedge angle, which is formed by the open face 5 and the partial face 21 with each other. Because of this, the partial cutting edge 25 has increased stability so that here as well, increased cutting forces are securely absorbed and vibrations are damped and preferably can be prevented.

A front rake angle is assigned to the partial cutting edge 25 that is formed by the partial face 21 with a plane that is perpendicular to a workpiece surface to be machined by the partial cutting edge 25, whereby it is aligned parallel to the partial cutting edge 25. This plane is indicated in dotted lines here as plane E. The cutting direction, in turn, is shown by arrow 8.

It can be seen that the partial face 21 rises opposite the cutting direction indicated by the arrow 8. A negative front rake angle is thus assigned to the partial cutting edge 25 and/or the partial face 21. In another exemplary embodiment that is not shown, a positive front rake angle can also be assigned to the partial cutting edge 25, however exemplary embodiments are preferred in which at least the front rake angle assigned to the partial cutting edge arranged closest to the longitudinal axis 13 of the drill bit 1 has a negative value. This ensures adequate stability of the center cutting edge 15, 15' in the area of the lowest cutting speeds, i.e. in the area of the center of the drill bit 1.

Figure 7:
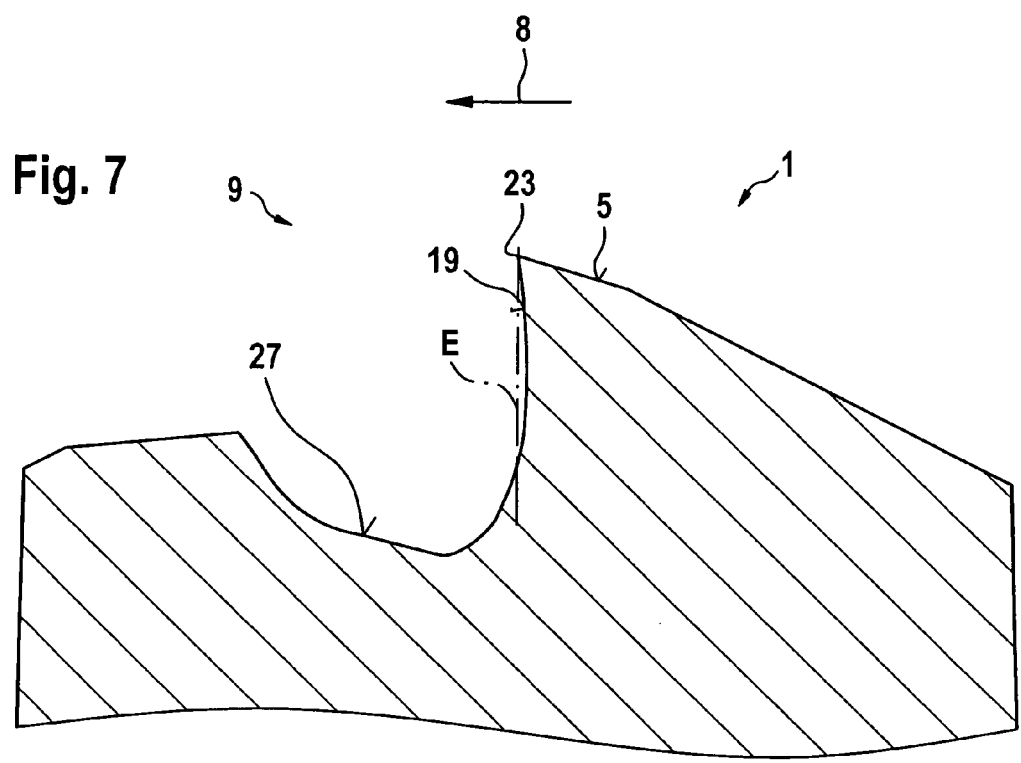
FIG. 7 shows a longitudinal cross section through the drill bit according to FIG. 3 in a plane at which the second partial cutting edge of the center cutting edge that lies the furthest radially outward is perpendicular.

FIG. 7 shows a longitudinal cross section through the drill bit 1 according to FIG. 3 in a plane at which the partial cutting edge 23 is perpendicular. The open face 5 and the partial face 19 of the rake face 11 have an intersection line that forms the partial cutting edge 23. In the view shown, the partial face 19 finally transitions into the lateral boundary surface 27 assigned to it. Here as well, a plane E is shown in dotted lines that is perpendicular to a workpiece surface to be machined by the partial cutting surface 23, whereby it is oriented parallel to the partial cutting edge 23. It can be seen here that the partial face 19 drops opposite the cutting direction indicated by the arrow 8, i.e. forms a positive front rake angle with the plane E. At the same time, it can be seen that the wedge angle formed by the open face 5 and the partial face 19 is smaller than in the area of the partial cutting edge 25. The partial cutting edge 23 thus has lower stability in comparison to the partial cutting edge 25, which is not a disadvantage since higher cutting speeds are already present here because the partial cutting edge 23 has a larger radial distance from the longitudinal axis 13 and/or the center of the drill bit 1. Because of the positive front rake angle that is assigned to the partial cutting edge 23, the chip space 9 in enlarged here, so discharge of the chips removed by the partial cutting edge 23 without friction is possible.

In another exemplary embodiment that it is not shown, it is also possible that a negative front rake angle can be assigned to the partial cutting edge 23. Depending on the arrangement of the partial cutting edges 25 and 23, and especially the cutting forces to be expected, this can be tuned to the concrete requirements for the drill 1. However preferably the front rake angle that is assigned to the partial cutting edge 23 is greater than the front rake angle that is assigned to the partial cutting edge 25.

Figure 8:
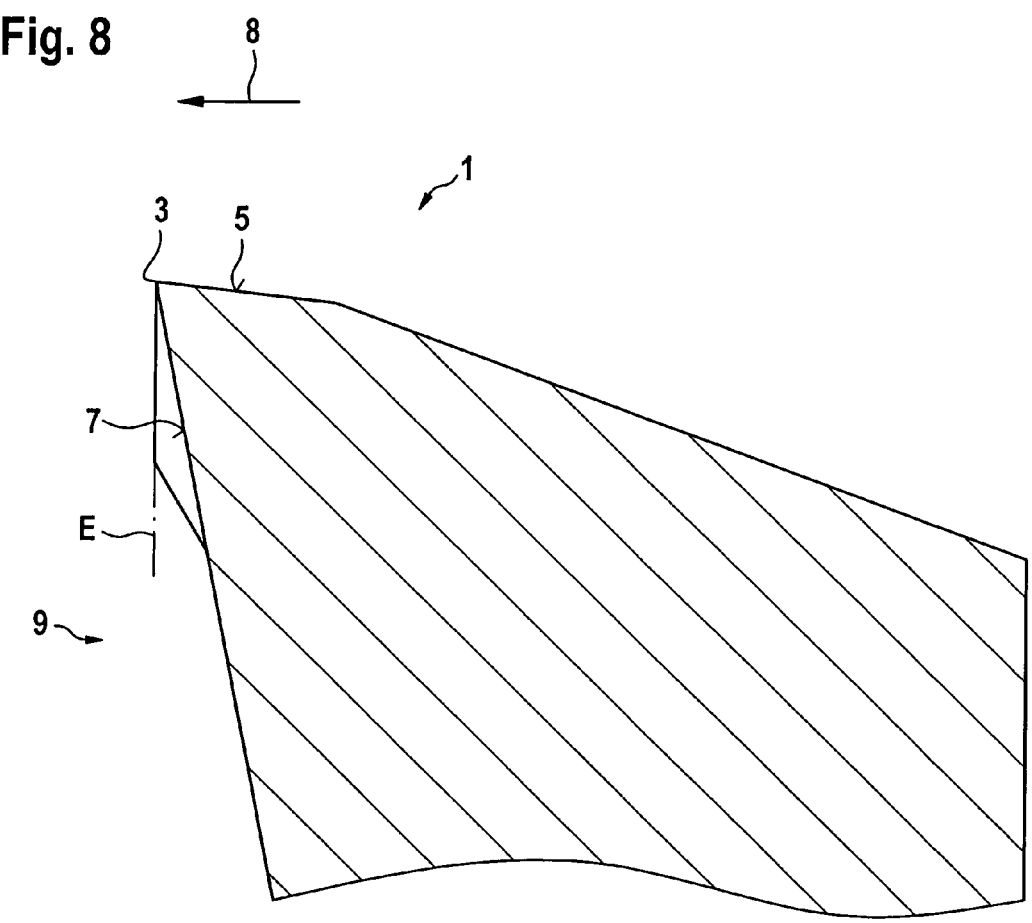
FIG. 8 shows a longitudinal cross section through the drill bit according to FIG. 3 in a plane in which the main cutting edge is perpendicular.

FIG. 8 shows a longitudinal cross section through the drill bit 1 according to FIG. 3 in a plane that is perpendicular to the main cutting edge 3. Elements that are the same or have the same function are provided with the same reference numbers so reference is made to the previous description regarding them. Here again, a plane E that is perpendicular to a workpiece surface to be machined by the main cutting edge 3 and is oriented parallel to the main cutting edge 3 is represented in dotted lines. The rake face 7 assigned to this forms a positive front rake angle with the plane E, i.e. it drops opposite the cutting direction shown by arrow 8. Preferably the front rake angle assigned to the main cutting edge 3 is greater than the front rake angle assigned to the partial cutting edge 23. Thus, in the area of high cutting speed, the rake face 7 extends especially far out of the chip space 9 so in this case a lot of space is available in which the chips can be removed with low friction.

Overall, the following can be seen: A front rake angle with a value that preferably increases with increasing radial distance of the assigned cutting edge, i.e. the main and/or partial cutting edge, from the longitudinal axis 13 of the drill bit 1 is assigned to the main cutting edge 3 and the at least two partial cutting edges 23, 25 of the center cutting edge 15. It is especially preferred that at least the front rake angle that is assigned to the partial cutting edge arranged closest to the longitudinal axis 13 of the drill bit 1 has a negative value. For this reason, adequate cutting edge stability is ensured especially in the area of lower cutting speeds, i.e. in the area of the center of the drill bit 1. The front rake angle that becomes larger step-by-step radially outward then ensures a larger chip space 9 in areas of higher cutting speed, so chips can flow out unimpeded. At the same time, it is easier to cut with the cutting edges with increasing front rake angles assigned to them so, seen radially outward from the longitudinal axis 13, with increasing cutting speed increasingly easier cutting with the cutting edges is available.

What has been said here in connection with FIGS. 6 to 8 naturally applies to each main cutting edge 3, 3' of a drill bit 1 that has at least a two-fold point thinning. Only for the sake of clarity, in the selected representation the dotted lines were dispensed with. If more than two point thinnings are provided, what has been said applies accordingly so that especially here in the area of the center of the drill bit a negative front rake angle is preferably provided, whereby the value of the front rake angle has increasingly larger values with increasing radial distance from the longitudinal axis 13 of the drill bit 1.

Figure 9:
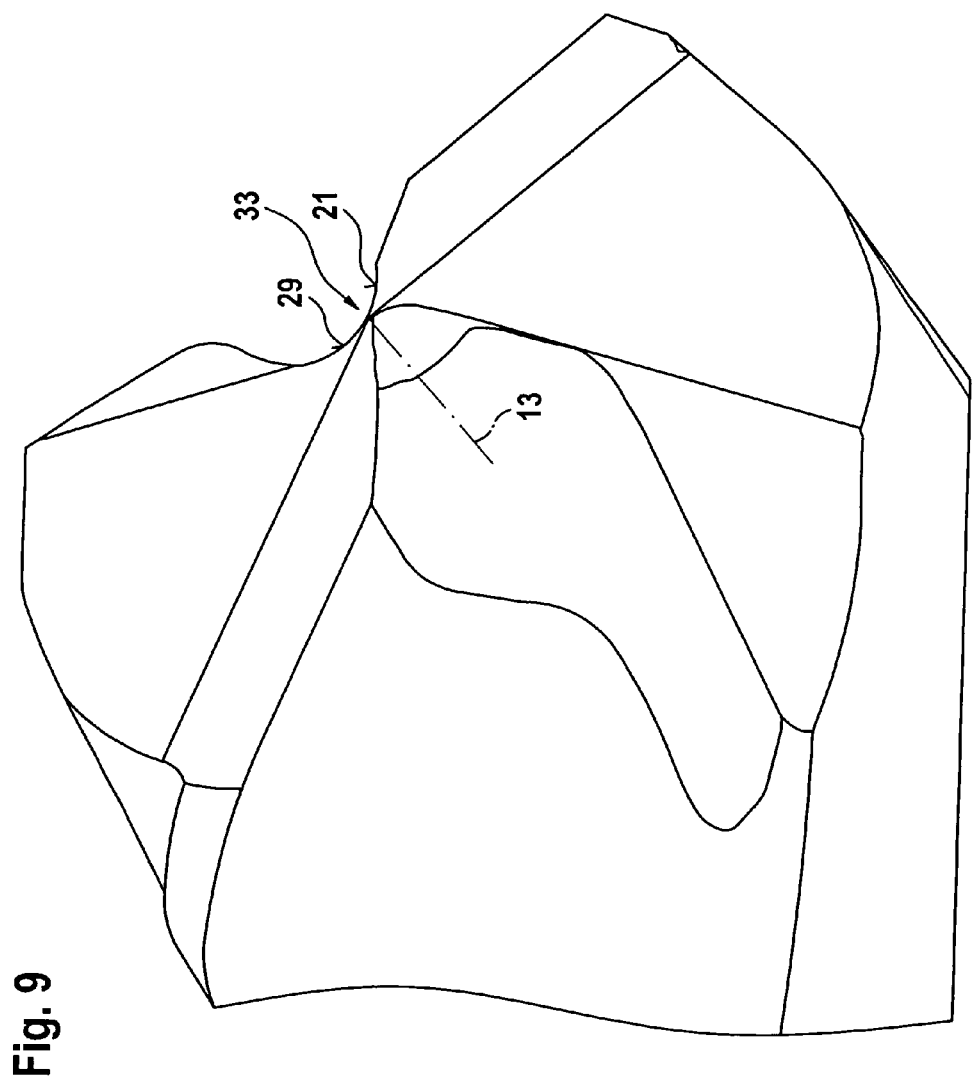
FIG. 9 shows a view of the drill bit according to FIG. 3, wherein the direction of view is chosen to be the direction of a lateral boundary surface of a partial face that is assigned to the partial cutting edge of the center cutting edge that is arranged radially next to the center.

FIG. 9 shows a view of a drill bit 1 according to FIG. 3, wherein the viewing direction of the observer runs in the direction of the lateral boundary surface 29 that is assigned to the partial face 21. The lateral boundary surface 29 thus is perpendicular to the drawing plane. Elements that are the same or have the same function are provided with the same reference numbers so reference is made to the previous description regarding them. The lateral boundary surface 29 forms a, preferably, acute angle with the longitudinal axis 13 of the drill bit 1. It can be seen that in the exemplary embodiment shown a rounded transition 33 is formed between the partial face 21 and the boundary surface 29.

FIG. 10 shows a view of the drill 1 according to FIG. 3, wherein the viewing direction of the observer is aligned in the direction of the lateral boundary surface 27 that is assigned to the partial face 19. Elements that are the same or have the same function are provided with the same reference numbers so reference is made to the previous description regarding them. With the longitudinal axis 13 of the drill bit 1, the lateral boundary surface 27 also preferably forms an acute angle, whereby its value is less than the value of the angle that the lateral boundary surface 29 forms with the longitudinal axis 13. This can especially be recognized in the following context: In FIG. 9, with a view oriented in the direction of the lateral boundary surface 29, no lateral boundary surfaces are visible. If the drill bit 1 is swung so that the viewing direction is oriented parallel to the lateral boundary surface 27, the lateral boundary surface 29 becomes visible. This thus forms a larger angle with the longitudinal axis 13 than the lateral boundary surface 27.

In the exemplary embodiment shown, the partial face 19 and the lateral boundary surface 27 transition into each other in the area of a rounded transition 35. It can be seen that the radius of the transition 35 is preferably greater here than the radius of the rounded transition 33, in the area of which the partial face 21 and the lateral boundary surface 29 assigned to each other transition into each other.

FIG. 11 shows a view of the drill bit 1 according to FIG. 3, whereby the viewing direction of the observer is selected in the direction of a lateral boundary surface 37 that is assigned to the rake face 7. Elements that are the same or have the same function are provided with the same reference numbers so reference is made to the previous description regarding them. Also the lateral boundary surface 37 preferably forms an acute angle with the longitudinal axis 13, which is not shown here for reasons of clarity. This angle is preferably less than the angle formed by the lateral boundary surfaces 27 and 29 with the longitudinal axis 13. This can be seen in that in FIGS. 9 and 10 the lateral boundary surface 37 is not visible. However if the drill bit 1 in the orientation shown in FIG. 10, in which the lateral boundary surface 29 is visible, is swiveled into the orientation shown in FIG. 11, the lateral boundary surface 27 is visible. Thus in FIG. 11, the lateral boundary surfaces 27 and 29 are visible, which accordingly form a larger angle with the longitudinal axis 13 than the boundary surface 37.

The preferably acute angle that each of the lateral boundary surfaces 27, 29, 37 forms with the longitudinal axis 13 of the drill bit 1 thus preferably increases with increasing radial distance from the longitudinal axis 13 of the drill bit 1 of the rake face and/or partial faces 7, 19, 21 assigned to them. The consequence of this is that the chip removal from the center area is clearly improved in comparison to the usual drill bits.

From FIG. 11, it is also clear that in the exemplary embodiment shown preferably a transition 39 between the rake face 7 and the lateral boundary surface 37 is designed so it is rounded. The radius of the rounding 39 is preferably greater than the radius in the area of roundings 33 and 35.

Especially preferably, the roundings of transitions 33, 35, 39 have an increasing radius with increasing radial distance of the rake face and/or partial face 7, 19, 21 assigned to a transition 33, 35, 39 from the longitudinal axis 13 of the drill bit 1. Because of this, the chips removed by the cutting edges 3, 23, 25 roll up in the form of a cone, which during drilling represents the most advantageous chip shape. Thus the drill bit geometry according to the invention improves not only the removal of the chips, but also gives them an especially advantageous shape.

Preferably, the transitions between the rake faces and/or partial faces 7, 19, 21 can each be designed with rounding. In an especially preferred exemplary embodiment, transitions between the main cutting edge 3 and the center cutting edge 15 and/or between the main cutting edge 3 and the partial cutting edge 23 and/or between it and the partial cutting edge 25 are designed with rounding.

Naturally what has been said in connection with FIGS. 9 to 11 also applies in the same way to each other main cutting edge 3, 3' of a drill bit 1, in the area of which at least a two-fold thinning out is provided. Mention of the deleted reference number was thus dispensed with, for reasons of clear representation only.

In other exemplary embodiments that are not shown, it is also possible to select different angles of the lateral boundary surfaces 27, 29, 37, especially in the area of each main cutting edge 3, 3' with at least two-fold point thinning. The same naturally also applies to the roundings and/or rounding radii in the area of the transitions 33, 35, 39. With yet another exemplary embodiment it is also possible that the rake faces and/or partial faces 7, 19, 21 transition into the lateral boundary surfaces 27 29, 37 assigned to them without rounding, rather in the area of transitions 33, 35, 39.

FIG. 12 shows a second exemplary embodiment of a drill bit 1 according to the invention. Elements that are the same or have the same function are provided with the same reference numbers so reference is made to the previous description regarding them. The drill bit 1 shown has three point thinning. The rake faces 11, 11' assigned to the center cutting edges 15, 15' thus also have three partial faces here. The rake face 11 comprises the partial faces 19, 21 and 41 and the rake face 11' comprises the partial faces 19', 21' and 41'. In turn, each of the partial faces 19, 19', 21, 21' and 41, 41' comprises a intersection line with the open faces 5, 5' so the center cutting edges 15, 15' comprise three partial cutting edges 23, 23', 25, 25' and 43, 43'.

FIG. 13 shows a side view of the drill bit 1 according to FIG. 12. In this case the partial faces 19, 21 and 41 are shown, which together with the rake face 11 form the center cutting edge 15. At the same time it can be seen that this comprises the three partial cutting edges 23, 25 and 43. In addition, the main cutting edge 3 is shown with the rake face 7 assigned to it.

It is obvious that for the drill bit according to FIGS. 12 and 13, all characteristics can be provided that were explained in connection with the drill bit according to FIG. 3. In particular, preferably the front rake angles that are assigned to the main and/or partial cutting edges 3, 23, 25, 43 behave as was explained in connection with FIGS. 6 to 8. In this case, preferably a negative front rake angle is assigned at least to the partial cutting edge 43. The front rake angle then increases radially toward the outside over the partial cutting edge 25 and the partial cutting edge 23 toward the main cutting edge 3. In particular, a negative front rake angle can also be assigned to the rake face 25, the absolute amount of which is preferably less than the absolute amount of the negative front rake angle that is assigned to the partial face 43. In another exemplary embodiment, it is naturally also possible that a positive front rake angle is already assigned to the partial cutting edge 25.

Preferably lateral boundary surfaces are also assigned to the rake face 7 and the partial faces 19, 21, 41, which especially preferably have characteristics that were explained in connection with FIGS. 9 to 11.

As already stated, exemplary embodiments are also possible that have more than three point thinnings. In these exemplary embodiments, preferably the characteristics described in connection with FIGS. 3 to 11 are also implemented analogously.

It can also be seen that the characteristics described here can be implemented in connection with drill bits 1 that have any number of main cutting edges 3, 3'. This means that for a drill bit 1 with a single main cutting edge 3 at least two point thinnings are provided, but another exemplary embodiment can also have more than two main cutting edges 3, 3' whereby on at least one main cutting edge, on a few cutting edges or even on all main cutting edges, at least two point thinnings can be provided. It is also possible to provide for various numbers of point thinnings in the area of different main cutting edges.

The drill bit geometry has proven to be especially advantageous in connection with solid hard metal drill bits or high-performance high speed steel drill bits. In spite of this, it is obvious to the person skilled in the art that the geometry according to the invention can also be provided for other drill bits. In particular, drill bits can be considered that have a base body and at least one hard metal cutting edge arranged on it. The hard metal cutting edge can preferably be soldered, glued or bolted to this base body.

It can also be seen that, from the center of the drill bit out, seen radially in the direction of the circumference surface 31, the two or more point thinnings are preferably each made in them with a smaller angle with respect to the longitudinal axis 13 of the drill bit 1.

Preferably front rake angles of the outer partial cutting edges are each larger than the ones lying further inward. Together with the advantageous geometry of the lateral boundary surfaces and the preferably rounded transitions between the rake face and/or partial faces and the lateral boundary surfaces, an adequate stability of the cutting edges in the area of the center and more efficient chip removal is achieved in the area of higher cutting speed. The chips are especially advantageously shaped, in fact rolled into cone shape, so they can be discharged optimally.

Overall it can be seen that the drill bit geometry according to the invention provides easier cutting by the cutting edges with simultaneously higher stability in the area of the center with increasing distance from the center and thus increasing cutting speed. In addition, an optimal chip shape and optimal chip removal can be ensured.

The invention claimed is:

1. Drill bit with at least one main cutting edge (3, 3') and at least one center cutting edge (15, 15'), wherein the drill bit (1) has a longitudinal axis (13) and wherein a rake face (7, 7'; 11, 11') is assigned-to the at least one main cutting edge (3, 3') and at least one center cutting edge (15, 15'), characterized in that:
    the rake face (11, 11') assigned to the at least one center cutting edge (15, 15') has at least two partial faces (19, 19'; 21; 21'; 41; 41') that—seen perpendicular to the longitudinal axis (13) of the drill bit (1)—form an obtuse angle with each other so the at least one center cutting edge (15, 15') comprises at least two partial cutting edges (23, 23'; 25, 25'; 43, 43'), and
    a front rake angle is assigned to the one main cutting edge (3, 3') and the at least two partial cutting edges (23, 23'; 25, 25'; 43, 43') of the center cutting edge (15, 5'), wherein the front rake angle has a value that increases with increasing radial distance of the assigned main cutting edge and/or partial cutting edge (3, 3'; 23, 23'; 25, 25'; 43, 43') with respect to the longitudinal axis of the drill bit (1).

2. Drill bit according to claim 1, characterized in that a lateral boundary surfaces (27, 29, 37) is assigned to the rake face (7, 7') of the main cutting edge (3, 3') and at least two partial faces (19, 19'; 21; 21'; 41; 41') of the rake face (11, 11') of the center cutting edge (15, 15').

3. Drill bit according to claim 2, characterized in that the rake face (7, 7') and/or the partial faces (19, 19'; 21; 21'; 41; 41') each form different angles with each of the lateral boundary surfaces (27, 29, 37) assigned to them.

4. Drill bit according to claim 3, characterized in that the angles formed by the rake face (7, 7') and/or the partial faces (19, 19'; 21; 21'; 41; 41') with the lateral boundary surfaces (27, 29, 37) assigned to them assume values between 60° and 140°.

5. Drill bit according to claim 4, characterized in that the angles are 100°.

6. Drill bit according to claim 2, characterized in that the lateral boundary surfaces (27, 29, 37) each form an acute angle with the longitudinal axis (13) of the drill bit (1), the value of which increases with increasing radial distance with respect to the longitudinal axis (13) of the drill bit (1) of the rake and/or partial faces (7, 7'; 19, 19'; 21; 21'; 41; 41') assigned to the lateral boundary surfaces (27, 29, 37).

7. Drill bit according to claim 1, characterized in that at least the front rake angle assigned to the partial cutting edge (23, 23'; 25, 25'; 43, 43') arranged next with respect to the longitudinal axis (13) of the drill bit (1) has a negative value.

8. Drill bit according to claim 2, characterized in that transitions between the rake face and/or partial faces (7, 7'; 19, 19'; 21; 21'; 41; 41') and/or the lateral boundary surfaces (27, 29, 37) are designed so they are rounded.

9. Drill bit according to claim 8, characterized in that the roundings of the transitions have an increasing radius with increasing radial distance of the rake and/or partial face (7, 7'; 19, 19'; 21; 21'; 41; 41') assigned to a transition from the longitudinal axis (13) of the drill bit (1).

10. Drill bit according to claim 1, characterized in that the transitions between the main cutting edge (3, 3') and the center cutting edge (15, 15') and/or between the at least two partial cutting edges (23, 23'; 25, 25'; 43, 43') of the center cutting edge (15, 15') are designed so they are rounded.

11. Drill bit according to claim 1, characterized in that the rake surface (11, 11') assigned to the at least one center cutting edge (15, 15') has three partial faces (19, 19'; 21; 21'; 41; 41') so that the at least one center cutting edge (15, 15') has at least three partial cutting edges (23, 23'; 25, 25'; 43, 43').

12. Drill bit according to claim 4, characterized in that the angles formed by the rake face (7, 7') and/or the partial faces (19, 19'; 21; 21'; 41; 41') with the lateral boundary surfaces (27, 29, 37) assigned to them assume values between 70° and 130°.

13. Drill bit according to claim 12, characterized in that the angles formed by the rake face (7, 7') and/or the partial faces (19, 19'; 21; 21'; 41; 41') with the lateral boundary surfaces (27, 29, 37) assigned to them assume values between 80° and 120°.

* * * * *